United States Patent [19]

Kanamaru

[11] Patent Number: 4,855,847

[45] Date of Patent: Aug. 8, 1989

[54] VIDEO DISK REPRODUCING DEVICE HAVING IMPROVED MOTOR SPEED CONTROL

[75] Inventor: Hitoshi Kanamaru, Saitama, Japan

[73] Assignee: Pioneer Electronic Corporation, Tokyo, Japan

[21] Appl. No.: 218,525

[22] Filed: Jul. 6, 1988

Related U.S. Application Data

[63] Continuation of Ser. No. 5,345, Jan. 12, 1987, abandoned, which is a continuation of Ser. No. 687,326, Dec. 28, 1984, abandoned.

[30] Foreign Application Priority Data

Dec. 29, 1983 [JP] Japan ............................ 58-202883[U]

[51] Int. Cl.$^4$ ........................ H04N 5/91; G11B 17/00
[52] U.S. Cl. .................................. 360/19.1; 360/73.03; 358/322; 358/342; 358/343; 369/50
[58] Field of Search ...................... 369/47–50; 360/19.1, 20, 30, 8; 358/342, 326, 343, 322

[56] References Cited

U.S. PATENT DOCUMENTS

| | | | |
|---|---|---|---|
| 4,296,446 | 10/1981 | Zorbalas | 360/73 |
| 4,338,683 | 7/1982 | Furukawa et al. | 360/73 X |
| 4,348,699 | 9/1982 | Tsuchiya et al. | 360/32 |
| 4,357,635 | 11/1982 | Haregawa | 369/47 XR |
| 4,398,219 | 8/1983 | Yasuda | 360/38.1 |
| 4,463,389 | 7/1984 | Golding | 360/8 |
| 4,476,499 | 10/1984 | Kanamaru et al. | 369/48 X |
| 4,532,561 | 7/1985 | Kimura et al. | 360/73 |
| 4,542,418 | 9/1985 | Yoneyama et al. | 360/19.1 |
| 4,542,423 | 9/1985 | Kotake et al. | 369/50 |
| 4,549,230 | 10/1985 | Odaka | 360/8 |
| 4,564,867 | 6/1986 | Nakajima | 369/48 X |
| 4,583,134 | 4/1986 | Nakamichi | 360/73 X |

FOREIGN PATENT DOCUMENTS

| | | | |
|---|---|---|---|
| 0107295 | 5/1984 | European Pat. Off. | 360/19.1 |
| 0049080 | 4/1980 | Japan | 360/19.1 |
| 0122208 | 9/1980 | Japan | 369/48 |
| 0074803 | 6/1981 | Japan | 360/19.1 |
| 0093130 | 7/1981 | Japan | 360/73 |
| 0064370 | 4/1982 | Japan | 369/47 |

Primary Examiner—Aristotelis M. Psitos
Attorney, Agent, or Firm—Sughrue, Mion, Zinn, Macpeak & Seas

[57] ABSTRACT

A data reproducing device with which, in reproducing a digitized audio signal, the speed of movement of a data detecting point of a pickup relative to the recording medium is controlled with high accuracy. A digitally modulated audio signal recorded in the form of a pulse train is extracted from the output of the pickup, and a clock signal is extracted from the former signal indicative of the presence of audio data. A changeover instruction signal is produced in response to the pulse train thus demodulated. A signal selecting switch circuit selectively outputs in response to the changeover instruction signal one of the extracted clock signal and a synchronizing signal contained in the reproduced video signal as a signal for controlling the speed of movement of the pickup relative to the recording medium.

4 Claims, 2 Drawing Sheets

VIDEO DISK REPRODUCING DEVICE HAVING IMPROVED MOTOR SPEED CONTROL

This is a Continuation of application Ser. No. 005,345 filed Jan. 12, 1987 now abandoned, which is a Continuation of application Ser. No. 687,326 filed Dec. 28, 1984 also abandoned.

BACKGROUND OF THE INVENTION

The present invention relates to data reproducing devices, and more particularly to a data reproducing device for reproducing data from a recording medium on which video data and audio data have been recorded in a multiplex mode.

Japanese patent application No. 45780/1983 discloses a system in which video data and audio data are recorded in a multiplex mode, and audio signals of wide dynamic range and high quality can be obtained. In this system, frequency modulation signals obtained by frequency-modulating a video signal and an audio signal are recorded on a recording medium. In addition, a pulse train signal obtained by digitizing an audio signal according to a predetermined digital modulation system is superposed on the frequency modulation signals recorded on the recording medium.

In this system, the audio signals are of two channels, and 2.3 MHz and 2.8 MHz audio carriers are frequency-modulated with two audio channel signals. The video signal is frequency converted so that it has a sync peak of 7.6 MHz, a pedestal level of 8.1 MHz, and a white peak of 9.3 MHz. The audio signal is converted into a pulse train signal by being digitized according to a modulation system such as a pulse code modulation (PCM) system. The pulse train signal is processed into a signal suitable for recording, for instance, by an EFM (eight-to-fourteen modulation) system. The frequency spectrum includes the frequency components of a pulse train having widths of 3T to 11T, where T is the bit period of a PCM signal, a pulse having a width of 3T is of about 720 kHz, and a pulse having a width of 11T is of about 200 kHz. Such a pulse train signal is superposed on the video main carrier with a level of about 1/10 or less, and is subjected to slice modulation near the zero crossings, as a result of which a pulse-width-modulated signal is obtained as a recording signal.

FIG. 1 shows the frequency spectrum of an RF (high frequency) signal which is obtained from a recording medium on which video data and audio data have been recorded according to the above-described recording system. In FIG. 1, reference character A designates the spectrum of a digitized audio signal; B, the spectrum of an audio FM signal; and C, the spectrum of a video FM signal. As the dynamic range of the digitized audio signal can be 90 dB or more, the tone quality is remarkably better than in the case of recording and reproducing audio data using a frequency modulation system.

In order to reproduce the audio signal thus digitized and recorded, it has been proposed to provide a PCM decoder adapted to decode and reproduce the digitized audio signal for a conventional data reproducing device which carries out only the reproduction of frequency-modulated and recorded video signals and audio signals. The PCM decoder has a buffer memory which stores PCM data successively. In the PCM decoder, the PCM data is read out of the buffer memory with the same period as the sampling period and decoded to reproduce audio signals. If, in the case where the data reproducing device is provided with such a PCM decoder, the PCM data reading speed, i.e., the speed of movement of the data detecting point relative to the recording medium, is not accurately controlled, overflow may take place in the buffer memory in the PCM decoder to which the PCM data are supplied.

With a data recording device provided with such a PCM decoder, it is necessary to selectively supply through a common output terminal to subsequent audio equipment either a reproduction signal obtained by reproducing an audio signal which was recorded in frequency-modulated form or an audio signal recorded in digitized form. In this case, if the switching operation for the selection is not automatically carried out, a complex manual switching operation is required, resulting in further drawbacks of the device.

SUMMARY OF THE INVENTION

Accordingly, an object of the invention is to provide a data reproducing device with which, in reproducing digitized audio data, the speed of movement of the data detecting point relative to the recording medium can be controlled with high accuracy.

Another object of the invention is to provide a data reproducing device capable of automatically selecting either the reproduction signal of an audio signal recorded in digitized form or that of an audio signal recorded in frequency-modulated form for output through a common output terminal.

A data reproducing device according to the invention is designed so that, in demodulating a signal provided in the form of a pulse train by digitally modulating an audio signal, the speed of movement of the data detecting point relative to the recording medium is controlled with the aid of a demodulated clock signal.

A data reproducing device according to the present invention comprises first demodulating means for extracting from an RF signal obtained from a recording medium a signal in the form of a pulse train produced by digitally modulating an audio signal and demodulating the signal thus extracted to provide an audio signal; second demodulating means for demodulating a frequency-modulated audio signal; and means for detecting the generation of an audio signal from the first demodulating means and producing a switching instruction signal for selecting one of the output of the first demodulating means or that of the second demodulating means to be fed to an audio signal output terminal.

DESCRIPTION OF THE PREFERRED EMBODIMENTS

A preferred embodiment of the invention will be described in detail with reference to FIG. 2.

Figure 1:
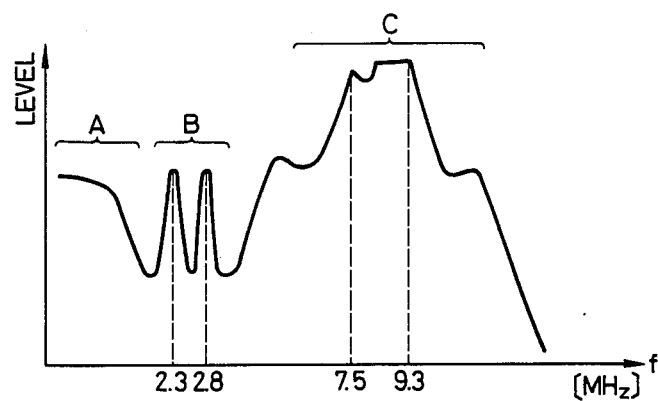
FIG. 1 is a diagram showing the frequency spectrum of an RF signal obtained from a recording medium in which signals obtained by frequency modulating a video signal and an audio signal and a pulse signal obtained by pulse-code modulating an audio signal have been recorded in a signal superposition mode.
Figure 2:
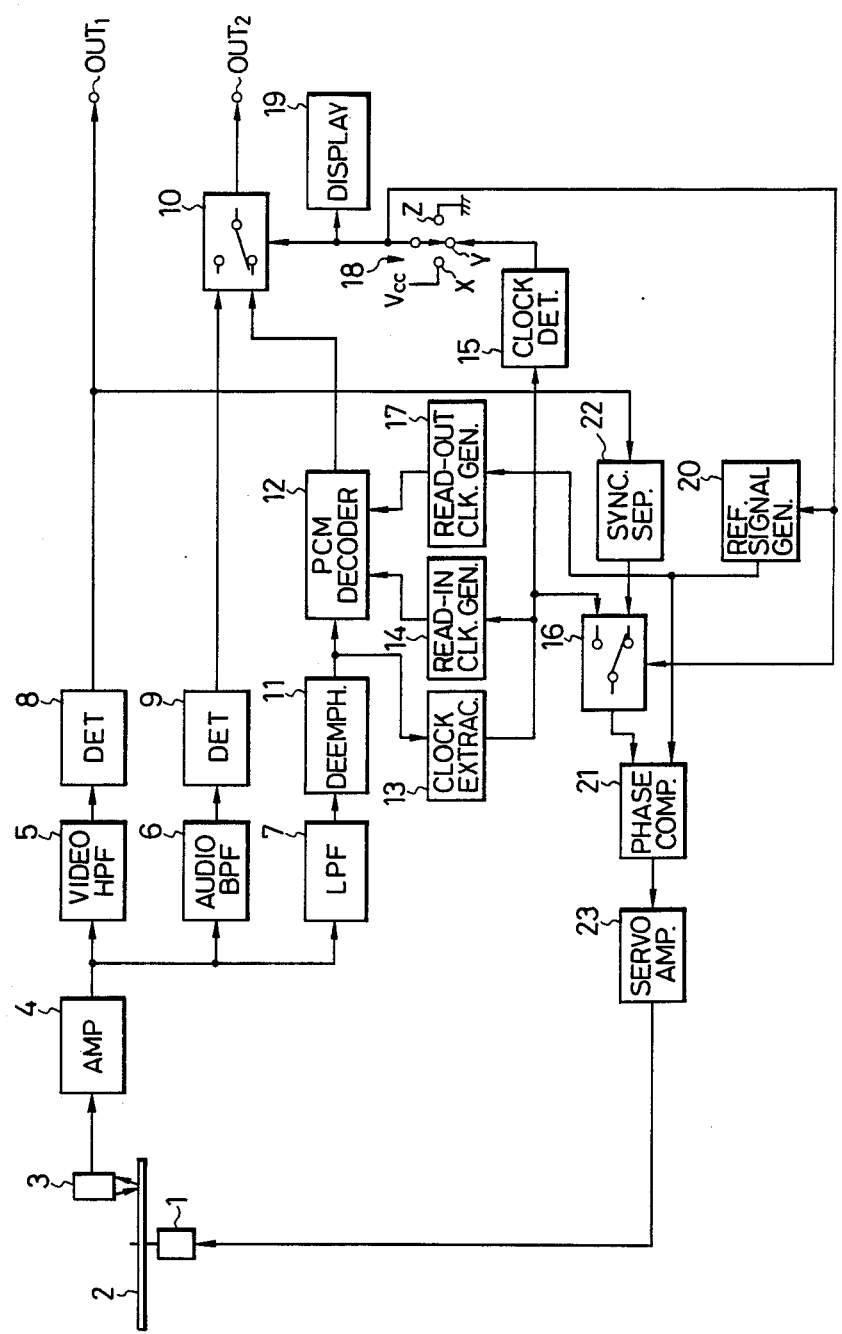
FIG. 2 is a block diagram of a preferred embodiment of a data reproducing device of the invention.

In FIG. 2, an RF signal including the recorded data from a video disk 2 rotated by a spindle motor 1 is read by a pickup 3. The RF signal thus read is amplified by an amplifier 4 and then applied to filters 5, 6 and 7 adapted to separate different data. The output of the video data extracting HPF (high-pass filter) 5 is supplied to a video detector 8 where it is demodulated into a video signal which is provided at an output terminal $OUT_1$. The output of the BPF (bandpass filter) 6 adapted to transmit only a 2.3 MHz or 2.8 MHz audio carrier component is applied to a detector 9 where it is subjected to FM detection to provide an audio signal which is applied to one input terminal of a changeover switch circuit 10.

The output of the LPF (low-pass filter) 7, which filter transmits only, for instance, an EFM signal including digital audio data, after a component emphasized at the time of recording is restored by a deemphasis circuit 11, is applied to a PCM decoder 12 and a reproduction clock extracting circuit 13. The circuit 13 produces a clock signal synchronous with the bits of the EFM signal. The clock signal from the reproduction clock extracting circuit 13 is applied to a read-in clock generating circuit 14, a clock detecting circuit 15 and one input terminal of a changeover switch 16. The read-in clock generating circuit 14 produces a read-in clock signal employed to read PCM data included in the EFM signal using the reproduction clock signal thus applied. With the aid of the read-in clock signal, the PCM data is read into a buffer memory in the PCM decoder 12. A read-out clock generating circuit 17 outputs a read-out clock signal having a frequency equal to a sampling frequency. The read-out clock signal is applied to the PCM decoder 12. Using the read-out clock signal, the PCM data is read out of the buffer memory in the PCM decoder 12 and decoded into an audio signal. The output of the PCM decoder 12 is applied to the other input terminal of the changeover switch 10. The output of the switch 10 is applied to an output terminal $OUT_2$. The signal provided at the movable contact of a changeover switch 18 is applied to the control input terminal of the changeover switch circuit 10.

The changeover switch 18 is manually operated so that its movable contact is brought into contact with one of the three stationary contacts X, Y and Z. A power source $V_{cc}$ is connected to the stationary contact X. The output of the clock detecting circuit 15 is applied to the stationary contact Y. The stationary contact Z is grounded. The signal provided at the movable contact of the changeover switch 18 is also applied to a display circuit 19 implemented with light-emitting diodes, etc., to a reference signal generating circuit 20, and to the control input terminal of the changeover switch 16. The clock detecting circuit 15, in response to the reproduction clock signal, produces a detection signal which is, for instance, a high logic level signal. The detection signal outputted by the clock detecting circuit 15 is applied as a changeover instruction signal to the stationary contact Y.

The reference signal generating circuit 20 provides, for instance, a 15.75 kHz horizontal synchronizing signal when a low logic level signal is applied to its control input terminal and a reference signal having a frequency, for instance about 2 MHz (much higher than the frequency of the reference horizontal synchronizing signal) when a high logic level signal is supplied to its control input terminal. The output of the reference signal generating circuit 20 is applied to the read-out clock generating circuit 17 and to a phase comparison circuit 21, where it is compared with the output of the changeover switch circuit 16. The horizontal synchronizing signal separated from the video signal by a reproduction synchronizing signal separator circuit 22 is applied to the other input terminal of the changeover switch circuit 16 which selects either the separated sync signal or the extracted clock for phase comparison with the output of the reference signal generating circuit 20. The output signal from the circuit 21 is applied to servo amplifier 23 adapted to drive the spindle motor 1. As a result, the spindle motor 1 is driven so that the phase difference between the two inputs to circuit 21 becomes zero. If desired, the output of the phase comparison circuit 21 may be applied to a tangential servo unit which, drives a tangential mirror adapted to finely adjust the time axis by finely adjusting the speed of movement of the data detection point relative to the video disk 2. Thus, the speed of movement of the data detection point of the pickup 3 relative to the video disk 2 is controlled.

It is assumed that, when a low logic level signal is applied to the control input terminals of the changeover switches 10 and 16, the output of the detector 9 and the reproduction horizontal synchronizing signal are outputted by the changeover switches 10 and 16, respectively, and when a high logic level signal is applied to the control input terminals of the switches 10 and 16, the output of the PCM decoder 12 and the reproduction clock signal are outputted by the switches 10 and 16, respectively. Then, in the case where, when the movable contact of the changeover switch 18 is in contact with the stationary contact Y, for instance, an EFM signal, including digital audio data present in the RF signal from the pickup 3, is supplied through the deemphasis circuit 11 to the reproduction clock extracting circuit 13 so that the reproduction clock signal is generated. As a result, the clock detecting circuit 15 outputs a detection signal at a high logic level. The detection signal is applied as a changeover instruction signal to the control input terminals of the changeover switches 10 and 16, the display circuit 19 and the reference signal generating circuit 20. Therefore, the output of the PCM decoder 12, i.e., the digitized and recorded audio signal, is selectively provided at the output terminal $OUT_2$. As the reproduction clock signal and the reference signal, which are much higher in frequency than the reproduction horizontal synchronizing signal and the reference horizontal synchronizing signal, are applied to the phase comparison circuit 21, the spindle motor 1 and the tangential mirror (not shown) are driven and positioned with high accuracy. At the same time, the display circuit 19 displays the fact that the signal provided at the output terminal $OUT_2$ is the digitized and recorded audio signal and the spindle motor 1, etc., are driven using the reproduction clock signal.

When the movable contact of the changeover switch 18 is set to the stationary contact X, the application of the output of the clock detecting circuit 15 is inhibited so that the signal switching operations by the changeover switches 10 and 16 are automatically stopped and the same state as that in the case where the changeover instruction signal is provided with the movable contact of the switch 18 in contact with the stationary contact Y is attained. That is, in this case also, a high logic level signal is applied to the changeover switches 10 and 16, the display circuit 19 and the reference signal generating circuit 20 so that the output of the PCM decoder 12 is selectively provided at the output terminal $OUT_2$. At the same time, the spindle motor 1 is driven with high accuracy, and the display circuit 19 displays the fact that the output of the PCM decoder 12 is provided at the output terminal OUT₂ and the spindle motor 1 is driven in response to the reproduction clock signal.

When the movable contact of the changeover switch 18 is brought into contact with the stationary contact Z, the application of the output of the clock detecting circuit 15 is inhibited so that the signal switching operations of the changeover switches 10 and 16 are automatically stopped, and the same state as that in the case where no changeover instruction signal is provided with the movable contact of the switch 18 being in contact with the stationary contact Y. That is, in this case, the low logic level signal is supplied to the changeover switches 10 and 16, the display circuit 19 and the reference signal generating circuit 20, so that the output of the detector 9, i.e., the FM-modulated and recorded audio signal, is selectively provided at the output terminal OUT₂. At the same time, the display circuit 19 displays the fact that the output of the detector 9 is provided at the output terminal OUT₂, and the reproduction horizontal synchronizing signal and the reference horizontal synchronizing signal are supplied to the phase comparison circuit 21.

In the above-described embodiment, one audio demodulation system is employed. However, two audio demodulation systems may be provided. Two-channel multiplexing of FM-modulated audio data is performed according to a frequency-division real-time multiplexing system, while two-channel multiplexing of digitally modulated audio data is carried out according to a time-division multiplexing system. Therefore, in this case, it is necessary to use a BPF for transmitting an audio carrier component different from that transmitted by the BPF, a changeover switch circuit similar in construction to the changeover switch circuit 10, and a demultiplexer for separating time-division multiplexed audio data of two channels.

As is apparent from the above description, the data reproducing device according to the invention is so designed that, when an audio signal provided in the form of a pulse train by digital modulation is demodulated, the speed of movement of the data detecting point relative to the recording medium is controlled using a demodulated clock signal of extremely high frequency. Therefore, the speed of movement of the data detecting point relative to the recording medium can be detected with considerably high accuracy, which prevents the occurrence of the above described difficulties, for instance, the overflow of the buffer memory in the PCM decoder.

A data reproducing device according to the present invention comprises a first demodulating means for extracting from an RF signal obtained from a recording medium a pulse train produced by digitally modulating an audio signal and demodulating the signal thus extracted to provide an audio signal; second demodulating means for demodulating a frequency-modulated audio signal; and means for detecting the generation of an audio signal from the first demodulating means and producing a switching instruction signal for selecting one of the output of the first demodulating means or that of the second demodulating means to be fed to an audio signal output terminal. Accordingly, automatic switching operation for signal selection is effected, thereby resulting in an improvement in operability.

What is claimed is:

1. A data reproducing device for reading via pickup means data from a recording medium, said data comprising a first signal obtained by frequency modulating a video signal including a synchronizing signal and optionally a second signal obtained by digitally modulating an audio signal including a clock signal, said first and second signals being recorded together on said recording medium, and for reproducing the data thus read, comprising:

means for extracting said clock signal from said data thus read when said second signal is present;

changeover instruction generating means for detecting the presence of said clock signal and producing a changeover instruction signal when the presence of said clock signal is detected;

means for extracting said synchronizing signal form said data thus read; and signal selecting means for selectively outputting, in response to said changeover instruction signal, said clock signal as a signal for controlling a speed of movement of a data detecting point of said pickup means relative to said recording medium and, in response to a lack of said changeover instruction signal, using said synchronizing signal as said signal for controlling said speed.

2. A data reproducing device for reading via pickup means data from a recording medium on which a signal obtained by f signal, a signal provided in the form of a pulse train by digitally modulating an audio signal, and an FM-modulated signal have been recorded in a signal superposition mode and for reproducing the data thus read, comprising:

an amplifier for amplifying an output of said pickup means;

a low-pass filter having an input coupled to an output of said amplifier;

a deemphasis circuit having an input coupled to an output of said low-pass filter;

a PCM decoder comprising a buffer memory, an input of said PCM decoder being coupled to an output of said deemphasis circuit;

a clock extracting circuit having an input coupled to said output of said deemphasis circuit;

a read-in clock generator having an input coupled to an output of said clock extracting circuit, an output of said read-in clock generator being applied to said PCM decoder to read data into said buffer memory;

a clock detecting circuit having an input coupled to said output of said clock extracting circuit for producing a log in signal in a first state when a clock signal is present on said output of said clock extracting circuit and a logic signal in a second state when no clock signal is present;

a high-pass filter having an input coupled to said output of said amplifier;

a video detector having an input coupled to an output of said high-pass filter;

synchronizing signal separating means for extracting a synchronizing signal form an output of said video detector;

first switch means having a first switch input coupled to said output of said clock extracting circuit and a second signal input coupled to an output of said synchronizing signal separating means, and a control input coupled to an output of said clock detector;

reference signal generating means having a control input coupled to said output of said clock detector for producing an output signal at a first frequency when said logic signal is in said first state and at a second frequency when said logic signal is in said second state;

a phase comparator having a first input coupled to an output of said first switch means and a second input coupled to an output of said reference signal generating means; and servo amplifier means having an input coupled to an output of said phase comparing means and an output coupled to control a speed of a motor for operatively moving said recording medium.

3. The data reproducing device of claim 2, further comprising a manual switch, said manual switch being inserted in series with said output of said clock detector, said manual switch having a first signal input coupled to said output of said clock detector and second and third inputs coupled to respective switches of fixed potentials, an output terminal of said manual switch being coupled to said inputs of said reference signal generating means and said control input of said first switch means.

4. The data reproducing device of claim 3, further comprising:

an audit bandpass filter having an input coupled to said output of said amplifier;

a FM detector having an input coupled to an output of said audio bandpass filter;

and second switch means having a first signal input coupled to an output of said FM detector, a second signal input coupled to an output of said FCM decoder, a control input coupled to said output of said manual switch, and an output coupled to an audio output terminal.

* * * * *